No. 746,723. Patented December 15, 1903.

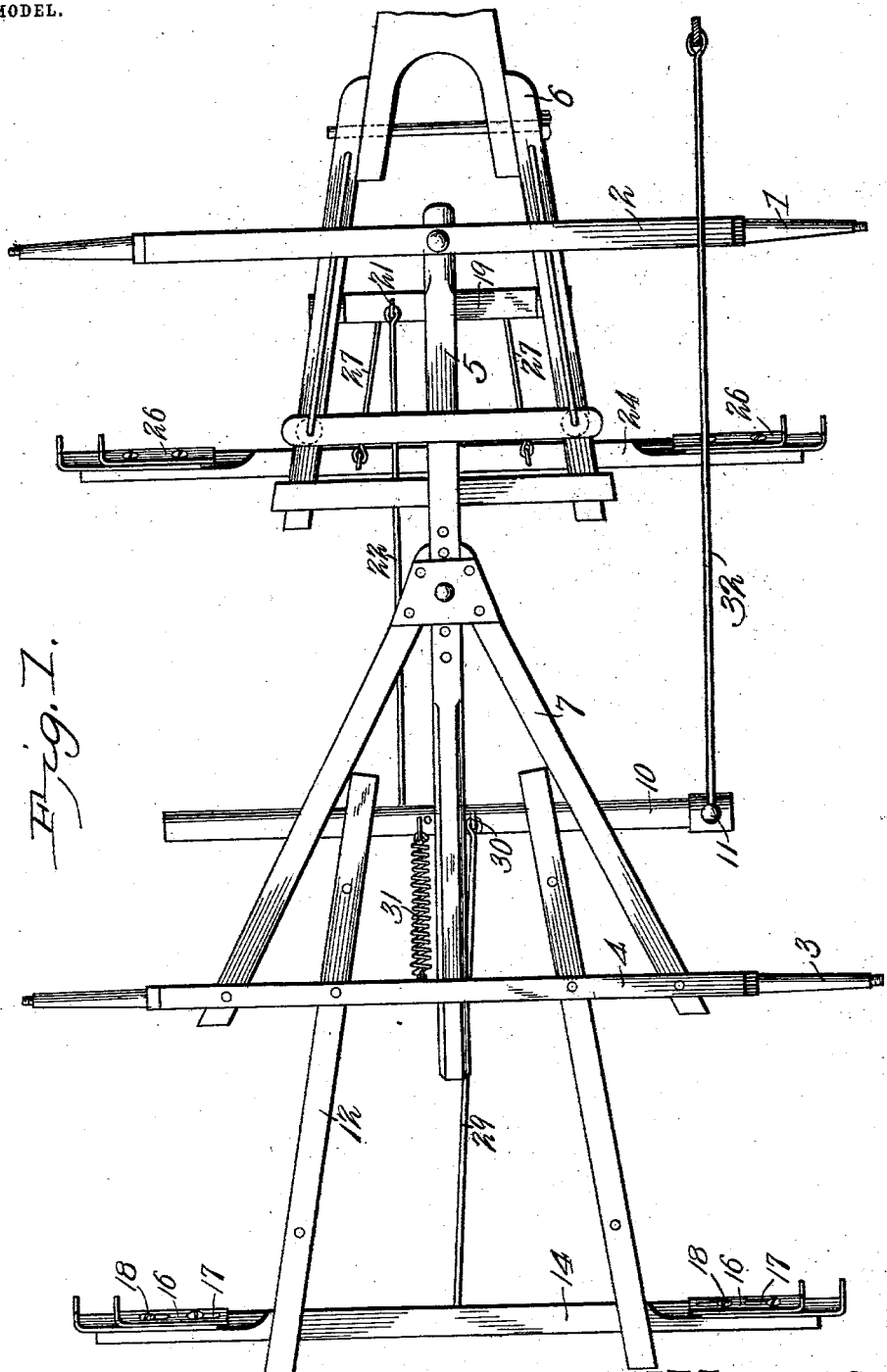

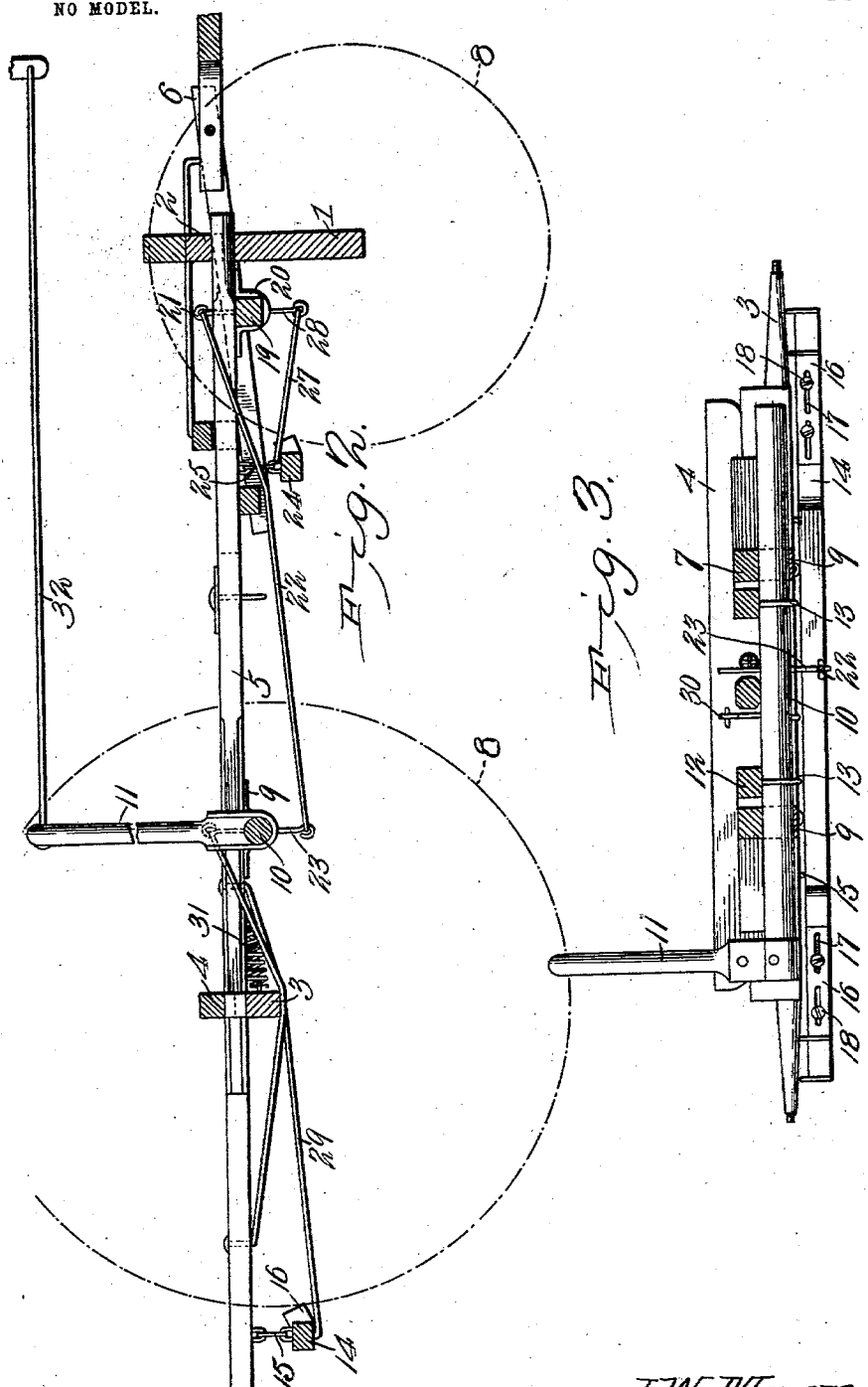

UNITED STATES PATENT OFFICE.

JOHN W. MANN, OF CENTER, INDIAN TERRITORY.

WHEEL-SCRAPER FOR WAGONS.

SPECIFICATION forming part of Letters Patent No. 746,723, dated December 15, 1903.

Application filed August 3, 1903. Serial No. 168,091. (No model.)

*To all whom it may concern:*

Be it known that I, JOHN W. MANN, a citizen of the United States, residing at Center, in the Chickasaw Nation, Indian Territory, have invented a new and useful Wheel-Scraper for Wagons, of which the following is a specification.

My invention relates to scrapers for vehicle-wheels, and has for its objects to produce a device of this character of simple construction which will be efficient in operation, one in which the scraping devices may be simultaneously thrown into and out of contact with the wheels, one in which the scraping devices are adjustable for vehicles of varying widths, and one in which the attachment as a whole may be readily applied to the various styles of vehicles now in general use.

To these ends the invention comprises the novel details of construction and combination of parts more fully hereinafter described.

In the accompanying drawings, Figure 1 is a plan view of a wagon running-gear having my invention applied thereto. Fig. 2 is a longitudinal sectional elevation of the same. Fig. 3 is a transverse sectional elevation.

Referring to the drawings, 1 indicates the front axle and 2 its bolster, 3 the rear axle and 4 its bolster, 5 the reach-beam, 6 the front hounds, and 7 the rear hounds, of a vehicle running-gear provided with wheels 8. These parts may be of any ordinary or desired construction and of any suitable material, inasmuch as they constitute no part of my invention.

In accordance with my invention I journal in suitable bearings 9, beneath the rear hounds 7, a primary rocking bar or member 10, disposed transversely of the running-gear and provided upon one of its ends with a removable operating-lever 11.

12 indicates a pair of extension-bars which are seated between their ends between the rear axle and bolster and have their forward ends attached to the rocking bar 10 by means of suitable straps or clips 13, which loosely encircle the latter. These bars project in rear of the axle and have attached to their under face adjacent to their rear ends a transverse scraper-bar 14, which is loosely and movably suspended by links 15. This bar carries at its opposite ends and upon its front face scraping blades or devices 16, which project beyond the ends of the bar and serve in practice to bear upon the rims of the rear wheels for scraping and freeing the same from mud. These blades are slotted, as at 17, for the reception of attaching-bolts 18, by which they are secured to the bar and are thus rendered adjustable longitudinally of the latter to accord with vehicles of varying widths and also for wheels the treads of which vary in width, there being at each end of the bar a pair of the blades the ends of which are angularly bent for engagement upon opposite sides of the wheel-felly.

19 is a secondary rocking bar or member disposed transversely of the running-gear and journaled at its ends in suitable bearings 20, attached beneath the front hounds 6. This bar has arising from its upper face a normally vertical arm 21, to the upper end of which is pivoted the front end of a connecting-rod 22, the rear end of which latter is pivoted to the lower end of a normally vertical arm 23, attached to and depending from the under face of the primary rocking bar 10, whereby the rocking bars are connected for simultaneous movement and the secondary bar adapted for operation by the primary bar.

24 indicates a transverse scraper-bar loosely and movably suspended from the lower face of hounds 6 by links 25. This bar is provided at opposite ends, upon its front edge, with scraping blades or devices 26, attached to the bar and adjustable in a manner identical with that above described in connection with the blades 16. The bar 24 is operatively connected with the rocking bar 19 by rods 27, secured at their rear ends to the scraper-bar and pivoted at their front ends to the lower ends of fingers 28, which depend vertically from the under face of bar 19, to which they are attached, whereby the bar 24 will when the bar 19 is rocked be actuated for bringing its scraping devices into and out of engagement with the front wheels. The scraper-bar 14 is operated for performing a similar office relative to the rear wheels by rocking of the primary bar 10, to which it is connected by a rod 29, attached at its rear end to the bar 14 and pivoted at its front end to the upper end of a finger 30, arising vertically from the upper face of bar 10.

31 indicates a spring attached at its opposite ends to the rear axle 3 and primary rocking bar 10, respectively, and serving to normally hold the latter in such position that the scraping devices will be out of contact with the wheels, it being understood, of course, that forward movement of lever 11 will rock the bar against the action of the spring and in the proper direction for moving the bar 14 to scraping position, the secondary bar 19 being likewise and simultaneously rocked for moving its scraper-bar to active position.

The lever 11 is connected by a bar 32 with a second lever situated adjacent to the driver's seat to permit operation of the device for moving the scrapers into and out of engagement with the wheel, as circumstances may require, it being understood, of course, that when the lever is released the spring 31 will automatically move the scrapers to inoperative position.

From the foregoing it will be seen that I produce a device of simple construction which will be efficient in operation and one which is admirably adapted for the attainment of the ends in view; but it is to be understood that I do not limit myself to the precise details herein set forth, inasmuch as minor changes therein may be made without departing from the spirit of the invention.

Having thus described my invention, what I claim is—

1. The combination with a vehicle running-gear and wheels, of a pair of rocking members pivotally associated with the running-gear one for each pair of wheels, operative connections between said members, a pair of scraper-bars carried by the running-gear and connected one with each member for operation thereby when rocked, said bars being provided with scraping devices and disposed to operate upon the front and rear wheels respectively, and means for simultaneously rocking the members.

2. The combination with a vehicle running-gear and wheels, of a pair of rocking members pivotally associated with the running-gear one for each pair of wheels and operatively connected for simultaneous movement, a pair of scraper-bars carried by the running-gear and connected one with each member for operation thereby when rocked, said bars being provided with scraping devices and disposed to operate upon the front and rear wheels respectively, means for simultaneously rocking the members to move the bars to operative position, and means for automatically returning the bars to inoperative position.

3. The combination with a vehicle running-gear and wheels, of a pair of rocking members pivotally associated with the running-gear, a pair of scraper-bars carried by the running-gear and connected one with each member for operation thereby, scraping devices adjustably connected with the bars and adjustable for wheel-treads of varying widths, and means for rocking the members to move the bars to operative position.

In testimony that I claim the foregoing as my own I have hereto affixed my signature in the presence of two witnesses.

JOHN W. MANN.

Witnesses:
JAMES H. WEBB,
J. M. CHENOWITH.